United States Patent Office 3,117,039
Patented Jan. 7, 1964

3,117,039
COMPOSITIONS FOR BRAZING AND COATING
Arthur T. Cape, Monterey, Calif., assignor to Coast Metals, Inc., Little Ferry, N.J., a corporation of Delaware
No Drawing. Filed Apr. 9, 1962, Ser. No. 185,818
1 Claim. (Cl. 148—24)

This invention relates generally to brazing and coating, but has reference more particularly to brazing or coating compositions and methods in which alloys containing boron and/or silicon are utilized as the brazing or coating alloy.

It has heretofore been proposed, as in Patent No. 2,296,442, in the welding and soldering of various metals, to utilize a flux composition, consisting essentially of an alkali borate, an alkali acid fluoride, one or more of the halogenides of the alkali metals, a halogenide of a rare earth metal, and halogenides of cadmium and copper. The halogenides of the alkali metals form 10 to 50% by weight fo the total composition, and function to make the slag resulting from the use of the flux composition easier flowing.

I have found, however, that in brazing or coating with brazing or coating alloys of the nickel-base, cobalt-base, iron-base and manganese-base type, containing boron and/or silicon, that the use of such a flux composition is of no value, due to the fact that the borates in the composition form free-flowing slags which are completely disastrous to a brazing or coating operation.

In order to eliminate the possibility of forming any appreciable amount of slag in brazing or coating with such brazing or coating alloys, and thereby produce excellent brazes and adherent coatings, I incorporate in the brazing or coating alloy a relatively small amount, i.e., from 0.5 to 5%, by weight of the brazing alloy, of one or more fluorides selected from the group consisting of caesium and rubidium fluorides. Chlorides of these or other alkali metals cannot be used in place of the fluorides, because they tend to form slags and other residues, which are detrimental to the brazing or coating process.

The caesium and/or rubidium fluoride is incorporated in the brazing or coating alloy unmixed with borates or any other ingredients which would tend to form any appreciable amount of slag, the fluoride being then completely effective to enhance the flow of the brazing or coating alloy. In the course of the brazing or coating operation, the fluoride, due to its high vapor pressure, disappears without leaving any slag residue, but the presence of the fluoride, even in the relatively small quantity indicated above, is extremely effective in the brazing or coating operation, because it produces extremely good conditions of flow of the brazing or coating alloy.

The invention is applicable to the brazing as well as coating of stainless steels, Rene 41 and like metals and super alloys with nickel-base, cobalt-base, iron-base, or manganese-base alloys, containing boron and/or silicon. As indicated in "Metal Progress" on pages 86 and 87 of the October 1961 issue, Rene 41 is a nickel-base superalloy consisting of 19% chromium, 11% cobalt, 10% molybdenum, 3% titanium, 1.5% aluminum and balance nickel.

Examples of such nickel-base alloys are those described in my U.S. Patents Nos. 2,743,177 and 2,755,183, containing silicon in amounts of from about 2.5 to about 5.5%, and boron in amounts of from about 0.75% to about 5.25%, with small amounts of iron, chromium and manganese.

A preferred example of a brazing or coating nickel-base alloy embodying the invention is an alloy consisting of about 97% of an alloy consisting of 91% nickel, about 4.5% silicon, about 3% boron, and about 1.5% of chromium and other elements, and about 3% of caesium fluoride.

Another example of such a nickel-base alloy embodying the invention is an alloy consisting of about 98% of an alloy consisting of about 82% nickel, 7% chromium, 4.5% silicon, 3% boron, 3% iron, .5 max. of other ingredients, and about 2% of rubidium fluoride.

Examples of such cobalt-base alloys are those described in U.S. Patent No. 2,801,165, containing 1.35–2.25% carbon, 26 to 30% chromium, 44–51% cobalt, 18.75 to 23.25% tungsten, 1.75% max. silicon, and 3% max. iron. Other examples would be alloys of the Stellite type.

Examples of such iron-base alloys are those described in my U.S. Patent No. 2,422,948 i.e. ferrous alloys containing from about 3% to about 5% carbon, from about 2% to about 10% nickel, from about 8% to about 22% chromium, from about 6% to about 12% molybdenum and from about 2.25% to about 5.5% silicon, the silicon and nickel contents being selected relative to one another as described in said patent.

Examples of such manganese-base alloys are Coast Metals No. 62, which contains 14–18% nickel, 1% max. silicon, .5–1.1% boron, 63–67% manganese, 14–18% cobalt, .06% max. carbon and 1.0% max. of other elements.

As an example of the use of the invention in the brazing of stainless steel, two plates of No. 304 stainless steel were brazed to each other by means of a nickel-base brazing alloy consisting of 97 parts by weight of an alloy consisting of 91% nickel, 4.5% silicon, 3% boron, and 1.5% of chromium, and 3 parts by weight of caesium fluoride, at a brazing temperature of 1800° F. The flow of the brazing alloy was excellent and uniform, and after the brazing operation, no slag residue was found in the brazed joint.

It may be noted that in the present invention, the fluoride, in contradistinction to the manner of use of the halide in Patent No. 2,296,442, is mixed with or incorporated as a part of the brazing or coating alloy. This considerably facilitates the use of the fluoride in the brazing or coating operation, rendering unnecessary the use of a flux composition which is separate and apart from the brazing or coating alloy.

It will be understood that various changes may be made in the invention without departing from the spirit of the invention or the scope of the appended claim.

This application is a continuation-in-part of my copending application, Serial No. 26,947, filed May 5, 1960, and now abandoned.

Having thus described my invention, I claim:

A composition for brazing and for coating stainless steels and superalloys, said composition consisting of a mixture of an alloy selected from the group consisting of nickel-base alloys, cobalt-base alloys, iron-base alloys, and manganese-base alloys, containing at least one element of the group consisting of boron and silicon, and from 0.5 to 5% of at least one fluoride selected from the group consisting of caesium and rubidium fluorides, said composition being free from slag forming ingredients.

References Cited in the file of this patent

UNITED STATES PATENTS

| | | |
|---|---|---|
| 2,296,442 | Horowitz | Sept. 22, 1942 |
| 2,403,109 | Miller | July 2, 1946 |
| 2,576,123 | Kilhgren | Nov. 27, 1951 |

FOREIGN PATENTS

| | | |
|---|---|---|
| 672,333 | Great Britain | May 21, 1952 |